United States Patent
Tsujita et al.

(10) Patent No.: US 11,402,582 B2
(45) Date of Patent: Aug. 2, 2022

(54) OPTICAL CONNECTOR MEMBER, OPTICAL CONNECTOR KIT, AND OPTICAL INTERCONNECTION

(71) Applicant: NITTO DENKO CORPORATION, Ibaraki (JP)

(72) Inventors: Yuichi Tsujita, Ibaraki (JP); Naoto Konegawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 259 days.

(21) Appl. No.: 16/090,704

(22) PCT Filed: Apr. 6, 2017

(86) PCT No.: PCT/JP2017/014359
§ 371 (c)(1),
(2) Date: Oct. 2, 2018

(87) PCT Pub. No.: WO2017/179483
PCT Pub. Date: Oct. 19, 2017

(65) Prior Publication Data
US 2020/0326477 A1 Oct. 15, 2020

(30) Foreign Application Priority Data

Apr. 12, 2016 (JP) .............................. JP2016-079377

(51) Int. Cl.
*G02B 6/26* (2006.01)
*G02B 6/30* (2006.01)
(Continued)

(52) U.S. Cl.
CPC ................. *G02B 6/26* (2013.01); *G02B 6/30* (2013.01); *G02B 6/3644* (2013.01); *G02B 6/3652* (2013.01); *G02B 6/4292* (2013.01)

(58) Field of Classification Search
CPC .......... G02B 6/26; G02B 6/30; G02B 6/3644; G02B 6/3652; G02B 6/3807; G02B 6/3885; G02B 6/4292
See application file for complete search history.

(56) References Cited

U.S. PATENT DOCUMENTS

| 4,759,595 A | * | 7/1988 | Boord | G02F 1/3132 385/21 |
| 4,973,127 A | * | 11/1990 | Cannon, Jr. | G02B 6/3839 156/158 |

(Continued)

FOREIGN PATENT DOCUMENTS

| JP | 2000-180649 A | 6/2000 |
| JP | 2007-127878 A | 5/2007 |

(Continued)

OTHER PUBLICATIONS

International Search Report dated Jul. 4, 2017, issued in counterpart International Application No. PCT/JP2017/014359 (2 pages).

(Continued)

*Primary Examiner* — Daniel Petkovsek
(74) *Attorney, Agent, or Firm* — WHDA, LLP

(57) ABSTRACT

An optical connector member is provided, which includes an optical waveguide retaining portion provided on one of opposite sides of an optical coupling portion and having a cavity for retaining an end portion of an optical waveguide, and an optical fiber retaining portion provided on the other side and having a through-hole for retaining an end portion of an optical fiber. A distal end face of the end portion of the optical waveguide retained in the cavity of the optical waveguide retaining portion and a distal end face of the end portion of the optical fiber retained in the through-hole of the optical fiber retaining portion are positioned in opposed relation to each other in the optical coupling portion with an (Continued)

optical axis of the optical waveguide in alignment with an optical axis of the optical fiber.

18 Claims, 10 Drawing Sheets

(51) Int. Cl.
*G02B 6/36* (2006.01)
*G02B 6/42* (2006.01)

(56) References Cited

U.S. PATENT DOCUMENTS

| | | | | |
|---|---|---|---|---|
| 4,983,012 A * | 1/1991 | Saito | .................... | G02B 6/3839 385/56 |
| 5,018,817 A * | 5/1991 | Suzuki | .................... | G02B 6/25 385/49 |
| 5,625,730 A * | 4/1997 | Ishikawa | .................. | G02B 6/30 385/49 |
| 5,835,659 A * | 11/1998 | Ota | ....................... | G02B 6/2746 385/137 |
| 6,085,003 A * | 7/2000 | Knight | ................. | G02B 6/3869 385/59 |
| 6,722,791 B2 * | 4/2004 | Cheng | .................... | G02B 6/3865 385/83 |
| 7,108,432 B2 * | 9/2006 | Nagasaka | ................ | G02B 6/32 385/129 |
| 8,032,003 B2 * | 10/2011 | Childers | .............. | G02B 6/3846 385/147 |
| 8,104,973 B2 * | 1/2012 | Howard | ............... | G02B 6/3825 385/59 |
| 2003/0007754 A1 * | 1/2003 | Terashima | ........... | G02B 6/4246 385/92 |
| 2004/0184702 A1 * | 9/2004 | Hayamizu | .............. | G02B 6/125 385/14 |
| 2010/0014815 A1 | 1/2010 | Ohmura et al. | | |
| 2011/0286701 A1 | 11/2011 | Mune et al. | | |
| 2012/0183264 A1 | 7/2012 | Shimotsu et al. | | |
| 2013/0322824 A1 | 12/2013 | Isenhour et al. | | |
| 2014/0099058 A1 | 4/2014 | Charbonneau-Lefort et al. | | |
| 2015/0010268 A1 | 1/2015 | Badihi et al. | | |

FOREIGN PATENT DOCUMENTS

| | | |
|---|---|---|
| JP | 2008-96669 A | 4/2008 |
| JP | 2011-17933 A | 1/2011 |
| JP | 2011-22198 A | 2/2011 |
| JP | 2011-247945 A | 12/2011 |
| JP | 2012-247732 A | 12/2012 |
| JP | 2014-164270 A | 9/2014 |
| TW | 201346370 A | 11/2013 |
| TW | 201400901 A | 1/2014 |

OTHER PUBLICATIONS

JPCA Standards "Detail Specification for PMT Connector JPCA-PE03-01-07S-2006" specified by Japan Electronics Packaging and Circuits Association, May 2006. w/English Abstract, (20 pages).
Office Action dated Mar. 2, 2020, issued in counterpart CN Application No. 201780019502.0, with English translation. (28 pages).
Notification of Transmittal of Translation of the International Preliminary Report on Patentability (Form PCT/IB/338) issued in counterpart International Application No. PCT/JP2017/014359 dated Oct. 25, 2018 with Forms PCT/IB/373 and PCT/ISA/237. (7 pages).
Office Action dated Jul. 11, 2019, issued in counterpart CN Application No. 201780019502.0, with English translation (20 pages).
Office Action dated Sep. 10, 2019, issued in counterpart JP Application No. 2016-079377, with English translation (7 pages).
Office Action dated May 7, 2021, issued in counterpart Korean Patent Application No. 10-2018-7027583 (8 pages; w/English translation).
Office Action dated Nov. 25, 2021, issued in counterpart Korean Patent Application No. 10-2018-7027583 (8 pages; w/ English translation).
Office Action dated Dec. 6, 2019, issued in counterpart TW Application No. 106111514, with English translation (9 pages).

* cited by examiner

RELATED ART

RELATED ART

OPTICAL CONNECTOR MEMBER, OPTICAL CONNECTOR KIT, AND OPTICAL INTERCONNECTION

TECHNICAL FIELD

The present disclosure relates to an optical connector member to be used for optically connecting an optical waveguide to some other optical guide, and further relates to an optical connector kit employing the optical connector member, and an optical interconnection established by the optical connector kit.

BACKGROUND ART

With recent increase in the integration density and the scale of electronic devices, heat generation and power consumption are an issue of concern for electric wirings often used for connection between boards in the devices and between chips on the boards. To cope with this, optical wiring (optical interconnection) technology has been developed in which lightweight flexible optical waveguides and optical fibers less liable to generate heat are employed in place of the electric wirings.

For the optical interconnection, optical connectors to be used for the connection between the boards have been standardized for shape, size, and test methods by JIS and other standardization organizations, and alignment coupling arrangements between the optical connectors have also been standardized. Therefore, different types of optical connectors can be easily connected to each other (see, for example, NPTL 1).

For example, as shown in FIG. 13, a first optical connector having a PMT ferrule (universal optical waveguide ferrule) 2 attached to an end (terminal) of an optical waveguide 1 and a second optical connector having an MT ferrule (universal optical fiber ferrule) 4 attached to an end portion of a multi-core optical fiber 3 can be easily connected to each other (optically coupled with each other) by two guide pins 5 with optical axes of the optical waveguide 1 accurately positioned with respect to optical axes of the multi-core optical fiber 3. In the present disclosure, the optical waveguide and the optical fiber are sometimes collectively referred to as "optical guide".

A known example of the optical connector is produced by assembling an optical connector member having a construction as shown in FIG. 14 (see PTL 1). The optical connector member is assembled in the following manner. First, an end portion of an optical waveguide 1 having upper and lower surfaces to which an adhesive agent is applied is fitted in an optical waveguide engagement recess 8 formed in an upper surface of a PMT ferrule body 7 with the optical waveguide 1 inserted through a PMT boot portion 6. Then, the optical waveguide 1 is positioned with respect to the PMT ferrule body 7 so that a distal end face 1a of the optical waveguide 1 is exposed from (flush with) a distal end face 7a of the PMT ferrule body 7 (also referred to as housing). In turn, the PMT boot portion 6 is press-inserted into an opening of a rear end face 7b of the PMT ferrule body 7, and a PMT cover 9 is pressed from above the PMT ferrule body. In this state, the adhesive agent is cured to unify these members. If the adhesive agent protrudes as a burr onto the distal end face 7a of the PMT ferrule body 7 serving as an optical coupling surface or the distal end face 1a of the optical waveguide 1 is dirty, optical coupling cannot be properly achieved. Therefore, the distal end face 7a of the PMT ferrule body 7 is polished. Thus, the optical connector is produced.

Alternatively, the optical coupling may be achieved by a connection method (passive alignment connection method) in which end faces of optical fibers 3 are brought into direct abutment against an end face of an optical waveguide 1 provided on a substrate without the use of the optical connector member.

In this method, as shown in FIG. 15A, the optical waveguide 1 provided on the substrate 10 includes an extension portion 11 of a cladding layer provided at a distal end thereof, and trenches 12 provided in properly spaced relation in the extension portion 11 for engagement with the optical fibers 3. As shown in FIG. 15B, the optical fibers 3 are respectively fitted in and fixed to the trenches 12 of the optical waveguide 1. Thus, the optical coupling between the optical fibers 3 and the optical waveguide 1 is achieved (see PTL 2).

RELATED ART DOCUMENT

Nonpatent Document

NPTL 1: JPCA Standards "Detail Specification for PMT Connector JPCA-PE03-01-07S-2006" specified by Japan Electronics Packaging and Circuits Association, May 2006

Patent Document

PTL 1: JP-A-2012-247732
PTL 2: JP-A-2011-247945

SUMMARY OF INVENTION

Where the optical connector member such as the PMT ferrule is used, however, the step of polishing the distal end face of the PMT ferrule body is required, problematically increasing the production costs. Further, the polishing of the distal end face of the PMT ferrule body is liable to damage the end face of the optical waveguide or to leave foreign matter on the end face of the optical waveguide. This often results in an optical connection loss. In the case of the optical connector for the optical fiber connection, the optical fibers generally project by several micrometers from the connection end face of the optical connector. If the optical fibers are repeatedly connected to the optical waveguide, the projecting end portions of the optical fibers are repeatedly brought into abutment against the end face of the optical waveguide to damage the end face of the optical waveguide, problematically increasing the optical connection loss. Since the optical connection is achieved with the two optical connectors in abutment against each other, the dimensional tolerances of the components of one of the two optical connectors and the dimensional tolerances of the components of the other optical connector are accumulated. This may reduce the positioning accuracy of the optical connectors when the optical connectors are connected to each other, thereby increasing the optical connection loss.

Where the optical fibers are connected directly to the optical waveguide, on the other hand, the depths of the trenches to be engaged with the optical fibers are limited to the thickness of the cladding layer of the optical waveguide. This may result in insufficient fixing of the optical fibers to the optical connector depending on the diameters of the optical fibers, thereby increasing the optical connection loss. Further, the distal end portions of the optical fibers are exposed, so that further consideration should be given to an arrangement for covering the distal end portions of the optical fibers.

In view of the foregoing, the present disclosure provides an excellent optical connector member which ensures proper optical coupling between the end portion of the optical waveguide and the end portions of the optical fibers with the optical axes of the optical waveguide in alignment with the optical axes of the optical fibers, and further provides an optical connector kit employing the optical connector member, and an optical interconnection established by the optical connector kit.

According to a first inventive aspect, there is provided an optical connector member, which includes a housing including: an optical waveguide retaining portion for retaining an end portion of an optical waveguide; an optical fiber retaining portion for retaining an end portion of an optical fiber; and an optical coupling portion provided between the optical waveguide retaining portion and the optical fiber retaining portion for optically coupling a distal end face of the end portion of the optical waveguide with a distal end face of the end portion of the optical fiber, wherein the optical waveguide retaining portion has an optical waveguide retaining cavity formed as a hole or a recess which extends from a first surface of the housing to the optical coupling portion, wherein the optical fiber retaining portion has an optical fiber retaining through-hole which extends from a second surface of the housing to the optical coupling portion, wherein the end portion of the optical waveguide and the end portion of the optical fiber are respectively retained in the cavity of the optical waveguide retaining portion and in the through-hole of the optical fiber retaining portion, and are positioned in opposed relation to each other in the optical coupling portion with an optical axis of the optical waveguide in alignment with an optical axis of the optical fiber.

According to a second inventive aspect, particularly, the optical waveguide retaining cavity of the optical waveguide retaining portion is hole-shaped, and the end portion of the optical waveguide is inserted in the hole-shaped cavity to be retained in the hole-shaped cavity in the optical connector member.

According to a third inventive aspect, particularly, the distal end face of the end portion of the optical waveguide and the distal end face of the end portion of the optical fiber are positioned to be spaced a distance d from each other in the optical coupling portion in the optical connector member. According to a fourth inventive aspect, particularly, the distance d between the distal end face of the end portion of the optical waveguide and the distal end face of the end portion of the optical fiber positioned in the optical coupling portion is 5 to 50 µm in the optical connector member.

According to a fifth inventive aspect, there is provided an optical connector kit which includes an optical waveguide and an optical connector member, wherein the optical connector member includes a housing including: an optical waveguide retaining portion which retains an end portion of the optical waveguide; an optical fiber retaining portion for retaining an end portion of an optical fiber; and an optical coupling portion provided between the optical waveguide retaining portion and the optical fiber retaining portion for optically coupling a distal end face of the end portion of the optical waveguide with a distal end face of the end portion of the optical fiber, wherein the optical waveguide retaining portion has a an optical waveguide retaining cavity formed as a hole or a recess which extends from a first surface of the housing to the optical coupling portion, wherein the optical fiber retaining portion has an optical fiber retaining through-hole which extends from a second surface of the housing to the optical coupling portion, wherein the end portion of the optical waveguide and the end portion of the optical fiber are respectively retained in the cavity of the optical waveguide retaining portion and in the through-hole of the optical fiber retaining portion, and are positioned in opposed relation to each other in the optical coupling portion with an optical axis of the optical waveguide in alignment with an optical axis of the optical fiber.

According to a sixth inventive aspect, particularly, the optical waveguide retaining cavity of the optical waveguide retaining portion of the optical connector member is a hole, and the end portion of the optical waveguide is inserted in the cavity to be retained therein.

According to a seventh inventive aspect, particularly, the distal end face of the end portion of the optical waveguide and the distal end face of the end portion of the optical fiber are positioned to be spaced a distance from each other in the optical coupling portion of the optical connector member in the optical connector kit. According to an eighth inventive aspect, particularly, the distance between the distal end face of the end portion of the optical waveguide and the distal end face of the end portion of the optical fiber positioned in the optical coupling portion is 5 to 50 µm in the optical connector kit.

According to a ninth inventive aspect, there is provided an optical interconnection, which includes an optical waveguide, an optical fiber, and an optical connector member, wherein the optical connector member includes a housing including: an optical waveguide retaining portion which retains an end portion of the optical waveguide; an optical fiber retaining portion which retains an end portion of the optical fiber; and an optical coupling portion provided between the optical waveguide retaining portion and the optical fiber retaining portion for optically coupling a distal end face of the end portion of the optical waveguide with a distal end face of the end portion of the optical fiber, wherein the optical waveguide retaining portion has an optical waveguide retaining cavity formed as a hole or a recess which extends from a first surface of the housing to the optical coupling portion, wherein the optical fiber retaining portion has an optical fiber retaining through-hole which extends from a second surface of the housing to the optical coupling portion, wherein the end portion of the optical waveguide and the end portion of the optical fiber are respectively retained in the cavity of the optical waveguide retaining portion and in the through-hole of the optical fiber retaining portion, and are positioned in opposed relation to each other in the optical coupling portion with an optical axis of the optical waveguide in alignment with an optical axis of the optical fiber.

According to a tenth inventive aspect, particularly, the optical waveguide retaining cavity of the optical waveguide retaining portion of the optical connector member is a hole, and the end portion of the optical waveguide is inserted in the cavity to be retained therein.

According to an eleventh inventive aspect, particularly, the distal end face of the end portion of the optical waveguide and the distal end face of the end portion of the optical fiber are positioned to be spaced a distance from each other in the optical coupling portion in the optical interconnection. According to a twelfth inventive aspect, particularly, the distance between the distal end face of the end portion of the optical waveguide and the distal end face of the end portion of the optical fiber is 5 to 50 µm in the optical interconnection.

In the present disclosure, the expression "with an optical axis of the optical waveguide in alignment with an optical axis of the optical fiber" means that the optical axis of the optical waveguide is aligned with the optical axis of the optical fiber to an extent such that optical signals can be properly transmitted. Therefore, these optical axes may be perfectly aligned with each other, or may be substantially aligned with each other for practically acceptable optical connection.

In the inventive optical connector member, the optical waveguide retaining portion having a cavity formed as a hole or a recess for retaining the end portion of the optical waveguide and the optical fiber retaining portion having the through-hole for retaining the end portion of the optical fiber are provided on opposite sides of the optical coupling portion in the housing. The end portion of the optical waveguide retained in the cavity of the optical waveguide retaining portion and the end portion of the optical fiber retained in the through-hole of the optical fiber retaining portion are positioned in opposed relation to each other in the optical coupling portion with the optical axis of the optical waveguide in alignment with the optical axis of the optical fiber.

With this arrangement, the optical coupling between the end portion of the optical waveguide and the end portion of the optical fiber can be easily achieved by retaining the end portion of the optical waveguide at one of opposite ends of the single housing and retaining the end portion of the optical fiber at the other end of the housing without bringing an optical connector retaining the end portion of the optical waveguide into abutment against an optical connector retaining the end portion of the optical fiber. Unlike the conventional optical connector, the need for the step of polishing the distal end face of the optical connector after the assembling of the optical connector can be obviated, making it possible to more efficiently perform the optical connection operation and reduce the costs.

Without the need to repeat the connection to the optical connector including the optical fiber projecting by several micrometers from the end face, the end face of the optical waveguide is prevented from being repeatedly damaged by the projecting end portion of the optical fiber in the connection between the optical waveguide and the optical fiber. Therefore, the optical connector member is free from the problem of the increase in optical connection loss over time. Further, the optical connector member is free from the problem of the reduction in positioning accuracy which may otherwise occur due to the cumulative tolerances when two optical connectors are kept in abutment against each other for the optical connection.

Since the end portion of the optical waveguide and the end portion of the optical fiber are respectively stably retained in the cavity and the through-hole provided in the housing, the optical connector member is free from the increase in optical connection loss which may otherwise occur due to insufficient and unstable fixing of the optical fiber in the conventional passive alignment connection. Therefore, reliable optical connection can be ensured for a longer period of time.

Particularly, where the optical waveguide retaining cavity of the optical waveguide retaining portion is a hole and the end portion of the optical waveguide is inserted in the cavity to be retained therein, the end portion of the optical waveguide can be easily retained in the cavity in substantially the same manner as when the end portion of the optical fiber is inserted in the through-hole of the housing to be retained in the through-hole. Thus, the optical connection operation can be more efficiently performed. In addition, the cavity is capable of more stably retaining the end portion of the optical waveguide, so that an optical connector having a more stable quality over time can be advantageously provided.

Particularly, where the distal end face of the end portion of the optical waveguide and the distal end face of the end portion of the optical fiber are positioned to be spaced the distance from each other in the optical coupling portion in the inventive optical connector member, the distal end face of the end portion of the optical fiber and the distal end face of the end portion of the optical waveguide are prevented from being brought into direct contact with each other. Therefore, the distal end faces are prevented from being mutually damaged, thereby minimizing the optical connection loss. Further, when the optical connector member is used in a higher-temperature atmosphere, the distal end faces are prevented from being mutually damaged due to thermal deformation thereof. Therefore, the optical connector member can be properly used without the increase in optical connection loss for a longer period of time.

Particularly, where the distance between the distal end face of the end portion of the optical waveguide and the distal end face of the end portion of the optical fiber positioned in the optical coupling portion is 5 to 50 μm in the inventive optical connector member, this arrangement is advantageous because the distance between the distal end faces in the optical coupling portion is short enough to reduce an influence on the optical connection loss to a negligible level.

In the inventive optical connector kit, which includes the optical waveguide and the optical connector member, the end portion of the optical waveguide and the end portion of the optical fiber are simultaneously directly retained in the housing of the optical connector member, and optically connected to each other. Therefore, the optical waveguide and the optical fiber can be easily optically connected to each other by combining the optical waveguide with the optical connector member in the optical connector kit and further combining the optical fiber with the optical connector member. Unlike the conventional optical connector, the need for the step of polishing the distal end face of the optical connector after the assembling of the optical connector can be obviated, making it possible to more efficiently perform the optical connection operation and reduce the costs.

Without the need to repeat the connection to the optical connector including the optical fiber projecting by several micrometers from the end face, the end face of the optical waveguide is prevented from being repeatedly damaged by the projecting end portion of the optical fiber in the optical connector employing the optical connector kit. Therefore, the optical connector is free from the problem of the increase in optical connection loss over time. Further, the optical connector is free from the problem of the reduction in positioning accuracy which may otherwise occur due to the cumulative tolerances when two optical connectors are kept in abutment against each other for the optical connection.

Since the end portion of the optical waveguide and the end portion of the optical fiber are respectively stably retained in the cavity and the through-hole provided in the housing in the optical connector, the optical connector is free from the increase in optical connection loss which may otherwise occur due to insufficient and unstable fixing of the optical fiber in the conventional passive alignment connection. Therefore, reliable optical connection can be ensured for a longer period of time.

Particularly, where the optical waveguide retaining cavity of the optical waveguide retaining portion of the optical connector member is a hole and the end portion of the optical waveguide is inserted in the cavity to be retained therein, the end portion of the optical waveguide can be easily retained in the cavity in substantially the same manner as when the end portion of the optical fiber is inserted in the through-hole of the housing to be retained in the through-hole. Thus, the optical connection operation can be more efficiently performed. In addition, the cavity is capable of more stably retaining the end portion of the optical waveguide, so that an optical connector having a more stable quality over time can be advantageously provided.

Particularly, where the distal end face of the end portion of the optical waveguide and the distal end face of the end portion of the optical fiber are positioned to be spaced the distance from each other in the optical coupling portion in the inventive optical connector kit, the distal end face of the end portion of the optical fiber and the distal end face of the end portion of the optical waveguide are prevented from being brought into direct contact with each other in the assembling. Therefore, the distal end faces are prevented from being mutually damaged, thereby minimizing the optical connection loss. Further, when the optical connector kit is used in a higher-temperature atmosphere, the distal end faces are prevented from being mutually damaged due to thermal deformation thereof. Therefore, the optical connector kit can be properly used without the increase in optical connection loss for a longer period of time.

Particularly, where the distance between the distal end face of the end portion of the optical waveguide and the distal end face of the end portion of the optical fiber positioned in the optical coupling portion is 5 to 50 μm in the inventive optical connector kit, this arrangement is advantageous because the distance between the distal end faces in the optical coupling portion is short enough to reduce an influence on the optical connection loss to a negligible level.

The inventive optical interconnection provides an optical connection structure which ensures cost reduction, a higher connection operation efficiency, a lower optical connection loss, and a higher quality. Since the end portion of the optical waveguide and the end portion of the optical fiber are stably unified with the housing of the optical connector member, the optical interconnection can be properly used without the increase in optical connection loss for a longer period of time.

Particularly, where the optical waveguide retaining cavity of the optical waveguide retaining portion of the optical connector member is a hole and the end portion of the optical waveguide is inserted in the cavity to be retained therein, the end portion of the optical waveguide is more stably retained in the cavity. Therefore, the optical interconnection advantageously maintains an optical connection structure having a more stable quality over time.

Particularly, where the distal end face of the end portion of the optical waveguide and the distal end face of the end portion of the optical fiber are positioned to be spaced the distance d from each other in the optical coupling portion in the inventive optical interconnection, the distal end face of the end portion of the optical fiber and the distal end face of the end portion of the optical waveguide are prevented from being brought into direct contact with each other in the assembling. Therefore, the distal end faces are prevented from being mutually damaged, thereby minimizing the optical connection loss. Further, when the optical interconnection is used in a higher-temperature atmosphere, the distal end faces are prevented from being mutually damaged due to thermal deformation thereof. Therefore, the optical interconnection can be properly used without the increase in optical connection loss for a longer period of time.

Particularly, where the distance between the distal end face of the end portion of the optical waveguide and the distal end face of the end portion of the optical fiber is 5 to 50 μm in the inventive optical interconnection, this arrangement is advantageous because the distance between the distal end faces in the optical coupling portion is short enough to reduce an influence on the optical connection loss to a negligible level.

DESCRIPTION OF EMBODIMENTS

Figure 1:
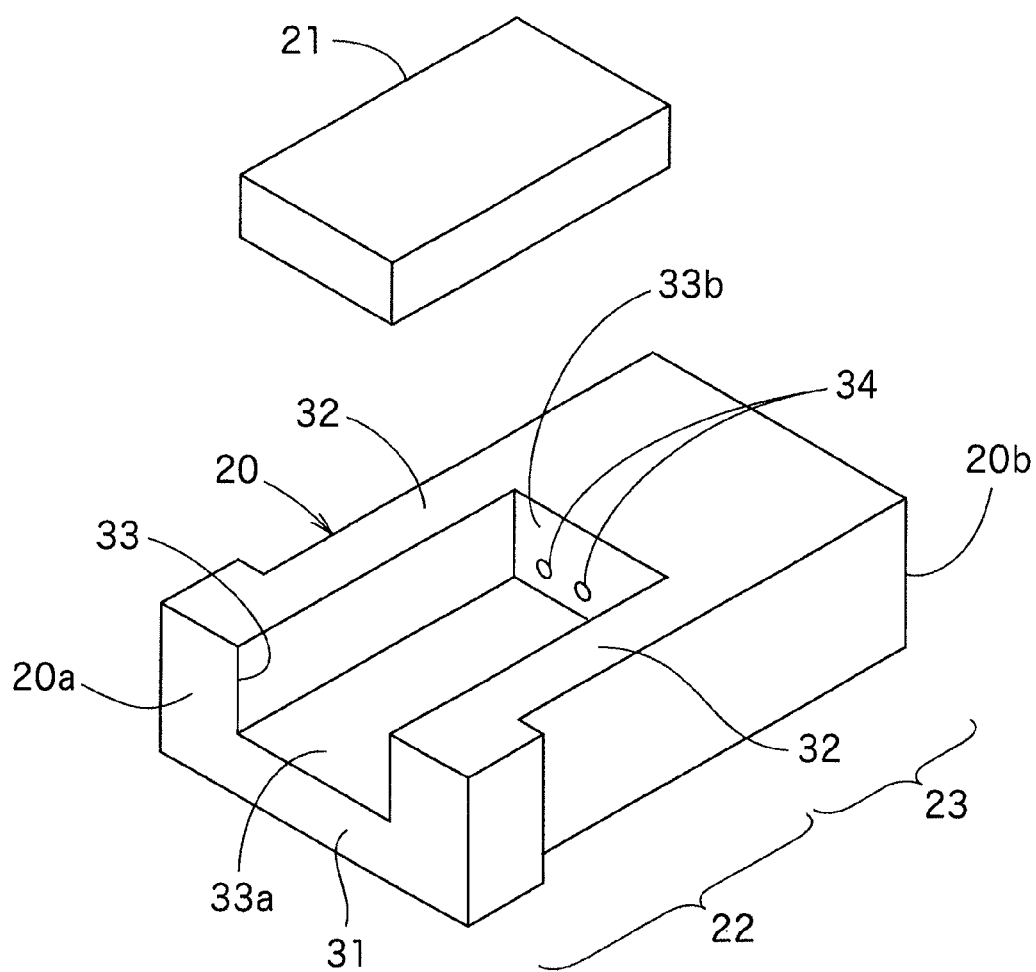
FIG. 1 is a partial perspective view showing an optical connector kit according to an embodiment of the present disclosure.

Next, embodiments of the present disclosure will be described in detail based on the attached drawings. However, it should be understood that the present disclosure be not limited to the following embodiments. In the drawings, components are schematically illustrated as each having a thickness, a size and the like different from actual ones.

FIG. 1 shows an optical connector member (hereinafter referred to simply as "connector member") to be used in an optical connector kit according to one embodiment of the present disclosure. The connector member has a housing 20 and a cover 21. The housing 20 includes an optical waveguide retaining portion 22 provided on a front side in FIG. 1 for retaining an end portion of an optical waveguide, and an optical fiber retaining portion 23 provided on a rear side in FIG. 1 for retaining end portions of optical fibers.

Figure 2B:
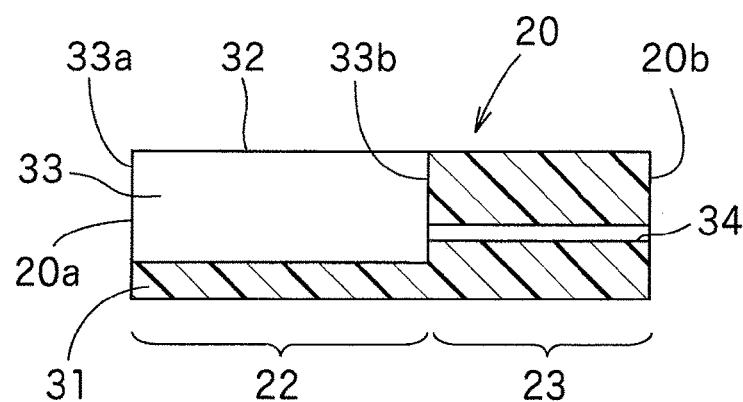
FIG. 2B is a sectional view of the housing taken along A-A' in FIG. 2A.
Figure 2C:
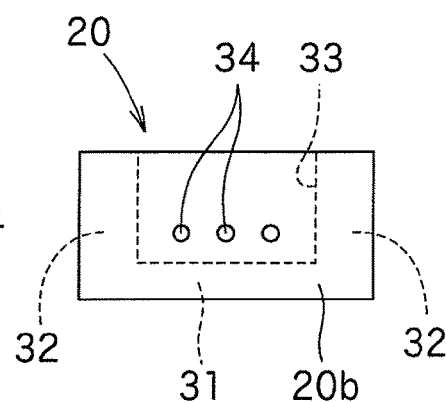
FIG. 2C is a right-side view of the housing of FIG. 2A.
Figure 2A:
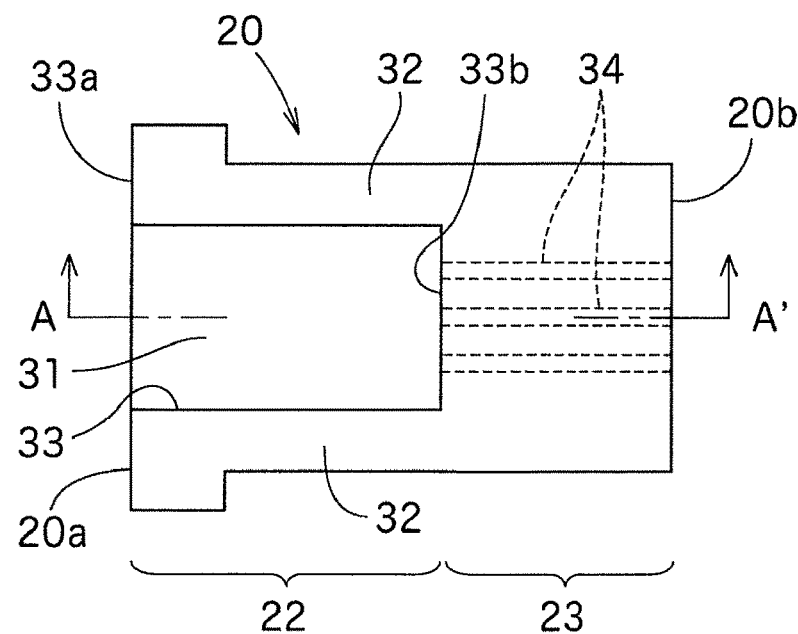
FIG. 2A is a plan view of a housing in the above embodiment.

More specifically, the optical waveguide retaining portion 22 of the housing 20 has a recess-shaped cavity 33 defined by a bottom wall portion 31, and right and left side wall portions 32 as shown in FIG. 2A (plan view), FIG. 2B (an A-A' sectional view), and FIG. 2C (a right side view of FIG. 2A). The end portion of the optical waveguide 15 is retained in the cavity 33 (see FIG. 3A). The cavity 33 has an opening 33a formed in a front end face 20a of the housing 20 in FIG. 1, and the opening 33a is used as an opening into which the end portion of the optical waveguide 15 is inserted. The cover 21 is used to close an upper opening of the cavity 33 to fix the end portion of the optical waveguide 15.

On the other hand, the optical fiber retaining portion 23 provided on an opposite side from the optical waveguide retaining portion 22 in the housing 20 has a plurality of through-holes 34 each extending from a rear end face 20b of the housing 20 to a rear end surface 33b of the cavity 33 of the optical waveguide retaining portion 22. The end portions of the optical fibers 40 are respectively inserted in the through-holes 34 to be retained in the through-holes 34 (see FIG. 3A).

Where a bottom surface of the cavity 33 of the optical waveguide retaining portion 22, i.e., an upper surface of the bottom wall portion 31, is defined as a reference surface, center axes of the through-holes 34 of the optical fiber retaining portion 23 extend horizontally at a predetermined height level with respect to the reference surface as shown in FIG. 2C, so that optical axes of cores 51 of the optical waveguide 15 (see FIG. 3B) retained in the cavity 33 are aligned with optical axes of the optical fibers 40 respectively retained in the through-holes 34. Therefore, the optical fibers 40 are optically coupled with the optical waveguide 15 with distal end faces of the end portions of the optical fibers 40 in abutment against a distal end face 15a of the end portion of the optical waveguide 15 (see FIG. 3A) on the rear end surface 33b of the cavity 33. Abutting portions between the distal end face 15a of the end portion of the optical waveguide 15 and the distal end faces of the end portions of the optical fibers 40, i.e., communication portions between the cavity 33 and the through-holes 34 on the rear end surface 33b of the cavity 33, serve as optical coupling portions in the housing 20.

Figure 3A:
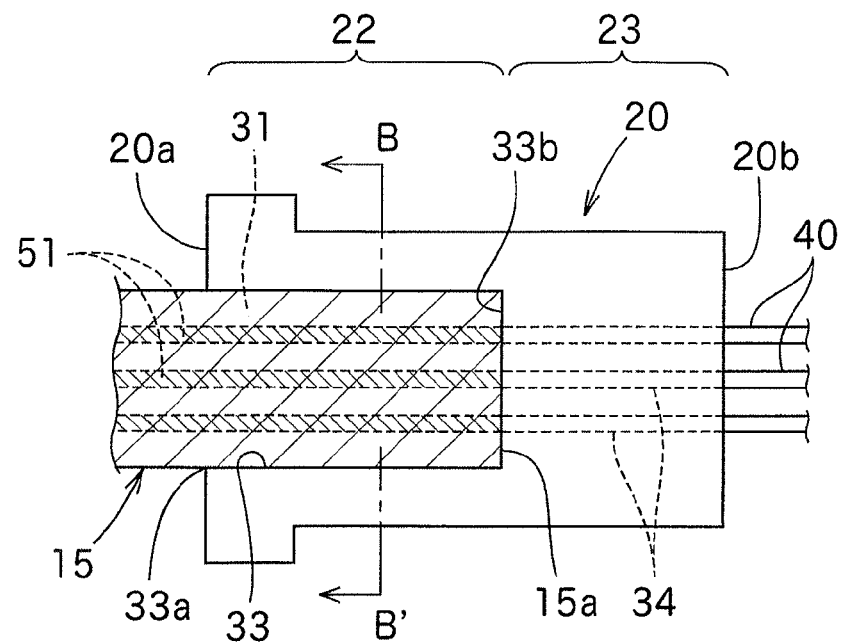
FIG. 3A is a plan view of the optical connector kit according to the above embodiment with an end portion of an optical waveguide and end portions of optical fibers retained in the housing thereof.

In the optical connector kit, as shown in FIG. 3A, the end portion of the optical waveguide 15 can be easily retained in the housing 20 by inserting the end portion of the optical waveguide 15 into the cavity 33 of the housing 20 of the connector member and pressing the cover 21 (see FIG. 1) into the cavity 33 from above to fix the end portion of the optical waveguide 15 in the cavity 33. Similarly, the end portions of the optical fibers 40 can be easily retained in the housing 20 by inserting the end portions of the optical fibers 40 into the through-holes 34 of the housing 20 and fixing the optical fibers 40 with the distal end faces of the end portions of the optical fibers kept flush with the rear end surface 33b of the cavity 33 to be exposed from the rear end surface 33b. In the following drawings, the shape of the optical waveguide 15 is shown by a rough hatching.

Thus, the optical waveguide 15 can be easily optically coupled with the optical fibers 40 simply by retaining the end portion of the optical waveguide 15 at one of opposite ends of the single housing 20 and retaining the end portions of the optical fibers 40 at the other end of the housing 20 without bringing the optical connector retaining the end portion of the optical waveguide into abutment against the optical connector retaining the end portions of the optical fibers as in the conventional case. In addition, the need for the step of polishing the distal end face of the optical connector after the assembling of the optical connector can be obviated, making it possible to more efficiently perform the optical connection operation and reduce the costs.

Without the need to repeat the connection to the optical connector including the optical fibers 40 projecting by several micrometers from the end face, the end face of the optical waveguide is prevented from being repeatedly damaged by the projecting end portions of the optical fibers 40 in the connection between the optical waveguide 15 and the optical fibers 40. Therefore, the optical connector is free from the problem of the increase in optical connection loss over time. Further, the optical connector is free from the problem of the reduction in positioning accuracy which may otherwise occur due to the cumulative tolerances when two optical connectors are kept in abutment against each other for the optical connection.

Since the end portion of the optical waveguide 15 and the end portions of the optical fibers 40 are respectively stably retained in the cavity 33 and the through-holes 34 provided in the housing 20, the optical connector is free from the increase in optical connection loss which may otherwise occur due to insufficient and unstable fixing of the optical fibers 40 as in the conventional passive alignment connection. Therefore, reliable optical connection can be ensured for a longer period of time.

An optical interconnection including the connection structure of the optical connector provides an optical connection structure which ensures cost reduction, a higher connection operation efficiency, a lower optical connection loss, and a higher quality. Since the end portion of the optical waveguide 15 and the end portions of the optical fibers 40 are stably unified with the housing 20 of the optical connector member, the optical interconnection can be properly used for a longer period of time without the increase in optical connection loss over time.

The housing 20 and the cover 21 to be used for the optical connector kit may be each formed through a transfer molding method, a molding method, an injection molding method or the like using a non-light-transmissive resin (e.g., a dark or black resin) prepared by adding a colorant such as a pigment or a filler such as titanium to a non-light-transmissive resin or a light-transmissive resin.

Figure 3B:
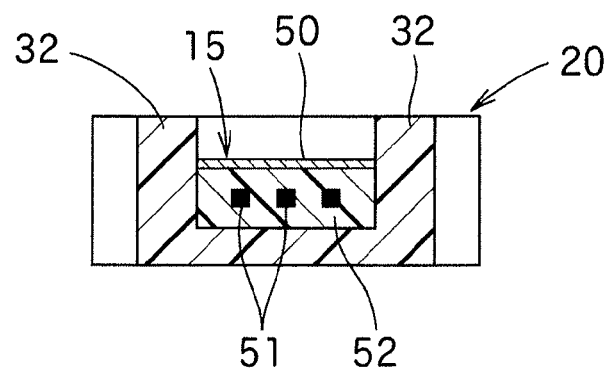
FIG. 3B is a sectional view of the optical connector kit taken along B-B' in FIG. 3A.

The optical waveguide 15 to be used for the optical connector kit is not particularly limited. For example, an optical waveguide including an insulation layer 50 serving as a substrate for an electric circuit, a plurality of cores 51, and cladding layers (an under-cladding layer and an over-cladding layer) 52 provided on upper and lower sides of the cores 51 to hold the cores 51 therebetween as shown in FIG. 3B (a sectional view taken along B-B' in FIG. 3A) is preferably used as the optical waveguide 15.

The optical waveguide 15 including the insulation layer 50 may be produced, for example, by forming the cladding layers 52 and the cores 51 in a stack on one surface of the insulation layer 50 by patterning through photolithography using UV-curable resins (e.g., epoxy resins and the like) and exposure masks. The cores 51 are designed to have a higher refractive index (photorefractive index) than the cladding layers 52 so that optical signals inputted into the cores 51 can be transmitted only through the insides of the cores 51.

The optical connector kit includes a boot portion as an accessory of the connector member for fixing the optical waveguide 15 to the housing 20. The boot portion has substantially the same structure as the conventional one and, therefore, duplicate description and illustration will be omitted. Some connector members have a boot portion unitarily provided on the end face 20a of the housing 20. In this case, there is no need to provide the boot portion as a separate member. Since the optical connector kit is adapted to optically couple the optical waveguide 15 with the optical fibers 40 in the housing 20, there is no need to provide the guide pin holes conventionally required for connection to another optical connector and the guide pins to be inserted into the guide pin holes.

In the above embodiment, the optical connection is achieved with the distal end face 15a of the end portion of the optical waveguide 15 in direct abutment against the distal end faces of the end portions of the optical fibers 40. Alternatively, small gaps such that an increase in optical connection loss is negligible may be provided between the distal end face 15a of the end portion of the optical waveguide 15 and the distal end faces of the end portions of the optical fibers 40. With the provision of the gaps, the distal end faces of the end portions of the optical fibers 40 are prevented from being brought into direct contact with the distal end face 15a of the end portion of the optical waveguide 15 in the assembling. Therefore, the distal end faces are prevented from being mutually damaged, thereby minimizing the optical connection loss. Further, when the optical connector kit is used in a higher-temperature atmosphere, the distal end faces are prevented from being mutually damaged due to thermal deformation thereof. Therefore, the optical connector kit can be properly used without the increase in optical connection loss for a longer period of time.

When the end portion of the optical waveguide 15 is inserted into the cavity 33, positioning means for providing the gaps in the optical coupling portion is preferably provided in order to prevent the distal end face 15a of the end portion of the optical waveguide 15 from reaching the rear end surface 33b of the cavity 33. An example of the positioning means is shown in a plan view of FIG. 4A and a partial perspective view of FIG. 4B.

Figure 4A:
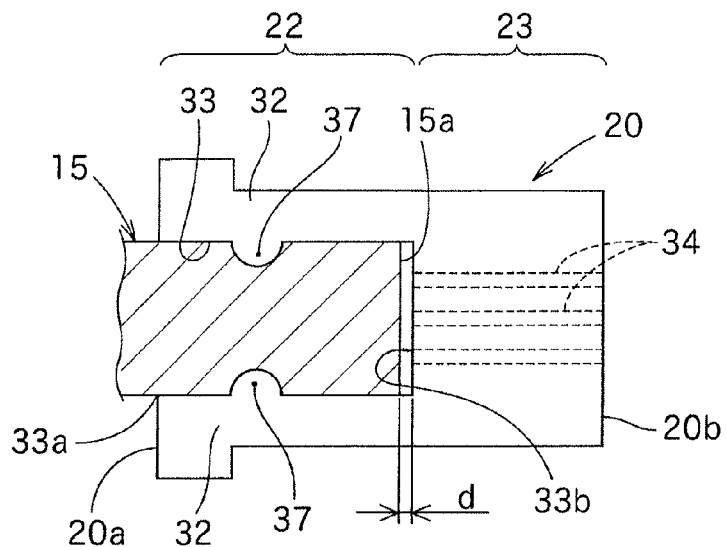
FIG. 4A is a plan view showing an optical connector kit according to another embodiment of the present disclosure with an end portion of an optical waveguide retained in a housing thereof.

The housing 20 has projections 37 (each having a semicircular shape as seen in plan) projecting into the cavity 33 from opposed inner surface portions of the right and left side wall portions 32 thereof near the end face 20a on the front side (on the left side in FIG. 4A). The cover 21 covering an upper portion of the cavity 33 has cutaway portions 38 (each having a semicircular shape as seen in plan) corresponding to the projections 37.

The optical waveguide 15 to be combined with the connector member has cutaway portions 39 (each having a semicircular shape as seen in plan) provided in the end portion thereof as corresponding to the projections 37 of the housing 20. The end portion of the optical waveguide 15 is put in the cavity 33 with the cutaway portions 39 in engagement with the projections 37 of the housing 20, whereby the distal end face 15a of the end portion of the optical waveguide 15 is positioned to be spaced a distance d from the rear end surface 33b of the cavity 33. The other structure is same as in the above embodiment. The end portions of the optical fibers 40 (see FIG. 3A) are respectively positioned in the through-holes 34 to be fixed in the optical fiber retaining portion 23 located on the right side in FIG. 4A with the distal end faces thereof kept flush with the openings of the rear end surface 33b of the cavity 33.

With this arrangement, the distal end face 15a of the end portion of the optical waveguide 15 attached to the housing 20 of the connector member can be positioned to be spaced the distance d from the rear end surface 33b of the cavity 33. Therefore, the distal end faces of the end portions of the optical fibers 40 are prevented from being brought into direct contact with the distal end face 15a of the end portion of the optical waveguide 15 in the assembling. Therefore, the distal end faces are prevented from being mutually damaged, thereby minimizing the optical connection loss. Further, when the optical connector kit is used in a higher-temperature atmosphere, the distal end faces are prevented from being mutually damaged due to thermal deformation thereof. Therefore, the optical connector kit can be properly used without the increase in optical connection loss for a longer period of time.

In the above embodiment, the projections 37 respectively project inward from the side wall portions 32 of the housing 20, and the cutaway portions 39 for the engagement with the projections 37 are provided in the end portion of the optical waveguide 15 to be retained in the cavity 33 of the housing 20. The arrangement for the engagement and the positioning of the optical waveguide 15 with respect to the housing 20 is not limited to this arrangement. Though not shown, for example, recesses may be provided in the side wall portions 32 of the housing 20 in opposed relation, and projections for engagement with the recesses may be provided on opposite side edges of the end portion of the optical waveguide 15. As in the above embodiment, the distal end face 15a of the end portion of the optical waveguide 15 can be positioned to be spaced the distance d from the rear end surface 33b of the cavity 33 by the engagement between the recesses and the projections. This arrangement provides the same effect as in the above embodiment.

In the inventive optical connector kit, the positioning of the distal end face 15a of the end portion of the optical waveguide 15 may be achieved by engaging a projection and a recess provided in the bottom wall portion 31 of the housing 20 with a recess and a projection provided in a lower surface of the optical waveguide 15 as corresponding to the projection and the recess of the housing 20, rather than by the engagement between the side wall portions 32 of the housing 20 of the connector member and the side edges of the optical waveguide 15.

Figure 5:
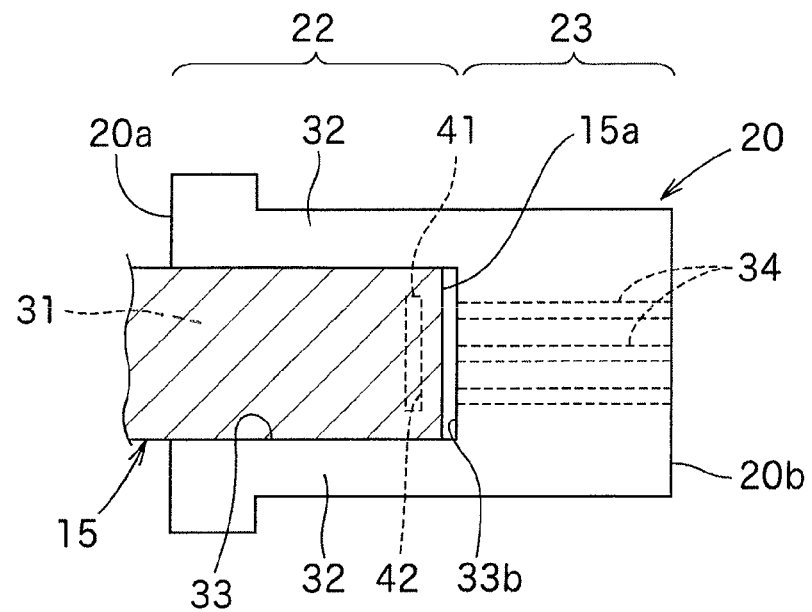
FIG. 5 is a plan view showing an optical connector kit according to further another embodiment with an end portion of an optical waveguide retained in a housing thereof.

For example, as shown in FIG. 5, an elongated projection 41 extending transversely of the optical waveguide 15 may be provided on the bottom wall portion 31 of the housing 20, and a recess 42 to be engaged with the projection 41 may be provided in the lower surface of the optical waveguide 15 as corresponding to the projection 41. Thus, the positioning of the optical waveguide 15 can be easily achieved.

The recess 42 can be formed at a higher dimensional accuracy by patterning when the cladding layer (over-cladding layer) 52 is formed over the cores 51 (see FIG. 3B) after the formation of the cores 51 in the production of the optical waveguide 15.

The shape of the projection 41 to be provided on the bottom wall portion 31 of the housing 20 is not limited to that shown in the above embodiment, but may be another shape. The projection 41 may be shaped as extending longitudinally of the optical waveguide 15, rather than extending transversely of the optical waveguide 15. The projection 41 may be a small round projection or a small polygonal projection as seen in plan, rather than the elongated projection. In this case, a recess 42 to be engaged with the projection 41 may be provided in the lower surface of the optical waveguide 15 as in the above embodiment.

Figure 6:
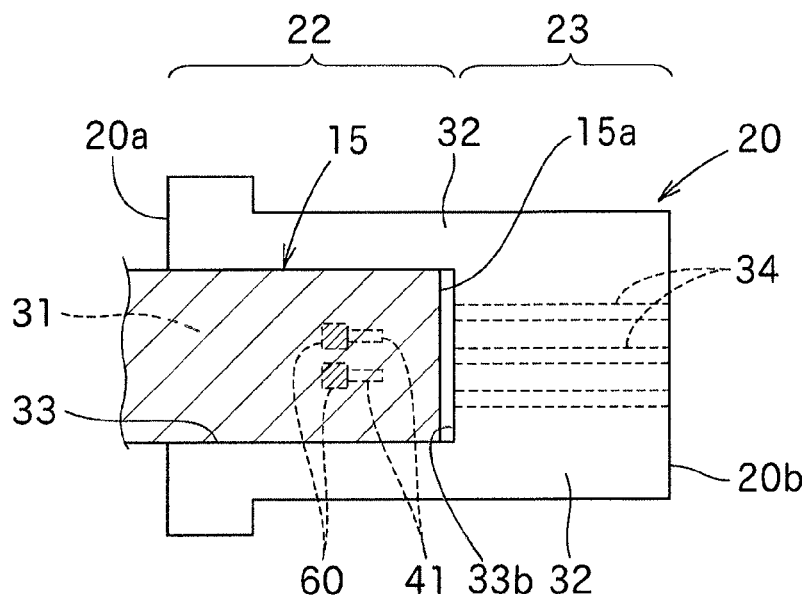
FIG. 6 is a plan view showing an optical connector kit according to another embodiment of the present disclosure with an end portion of an optical waveguide retained in a housing thereof.

For example, as shown in FIG. 6, two projections 41 each extending longitudinally of the optical waveguide 15 may be provided on the bottom wall portion 31 of the housing 20. Dummy cores 60 different from the cores 51 serving as optical paths may be provided on the lower surface of the optical waveguide 15, and the dummy cores 60 may be uncovered with the cladding layer 52 and exposed from the cladding layer 52 (see FIG. 3B for the cores 51 and the cladding layer 52). Thus, the dummy cores 60 of the optical waveguide 15 can be used as stoppers when the optical waveguide 15 is inserted into the housing 20 from the end face 20*a* of the housing 20. With this arrangement, the dummy cores 60 can be formed along with the cores 51 at a higher dimensional accuracy. Therefore, the positioning accuracy of the distal end face 15*a* of the end portion of the optical waveguide 15 can be improved.

In the embodiments shown in FIGS. 4A to 6, the distal end face 15*a* of the end portion of the optical waveguide 15 is positioned to be spaced the distance d from the rear end surface 33*b* of the cavity 33 by engaging the projections 37 or the like provided on the housing 20 of the connector member with the cutaway portions 39 or the like provided in the optical waveguide 15. Alternatively, a projection or a recess may be provided on a lower surface of the cover 21 (see FIG. 1) which covers the upper portion of the cavity 33, and a recess or a projection to be engaged with the projection or the recess may be provided in an upper surface of the optical waveguide 15 (an upper surface of the insulation layer 50 in the above embodiments). With this arrangement, the cover 21 engaged with the optical waveguide 15 is inserted or put in the cavity 33 of the housing 20 (though not shown).

Further, the distal end face 15*a* of the end portion of the optical waveguide 15 can be positioned to be spaced the distance d from the rear end surface 33*b* of the cavity 33 by providing the positioning means only on the housing 20 of the connector member without performing any special process on the optical waveguide 15.

Figure 7:
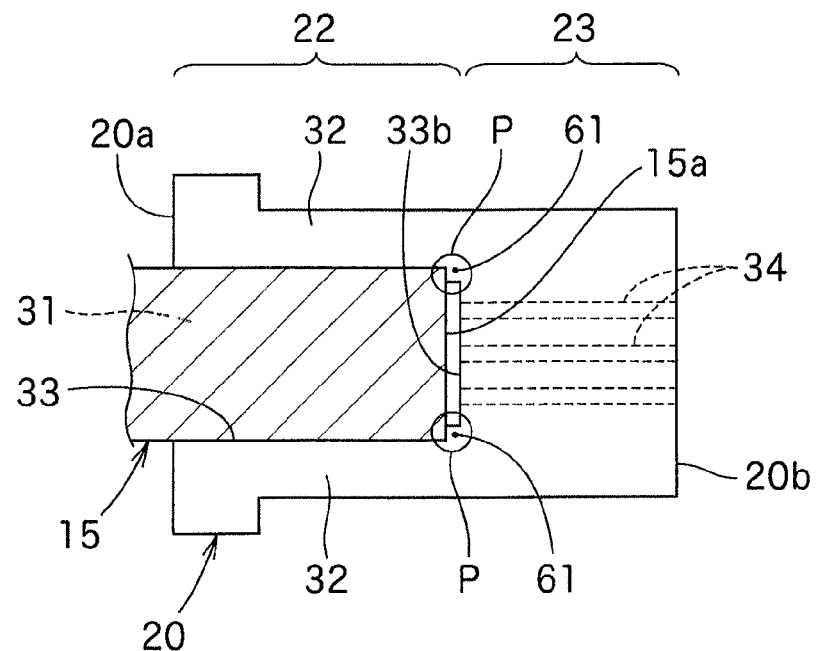
FIG. 7 is a plan view showing an optical connector kit according to further another embodiment of the present disclosure with an end portion of an optical waveguide retained in a housing thereof.

For example, as indicated by small circles P in FIG. 7, stoppers 61 for forming a gap having the distance d between the distal end face 15*a* of the end portion of the optical waveguide 15 and the rear end surface 33*b* are provided on opposite ends of the rear end surface 33*b* of the cavity 33 of the housing 20, whereby the distal end surface 15*a* of the end portion of the optical waveguide 15 can be properly positioned with the optical waveguide 15 prevented from further advancing toward the rear end surface 33*b* of the housing 20.

The stoppers 61 provided on the rear end surface 33*b* of the cavity 33 may each have any shape, as long as the optical coupling between the optical waveguide 15 and the optical fibers 40 (see FIG. 3A) is not hindered.

Figure 8:
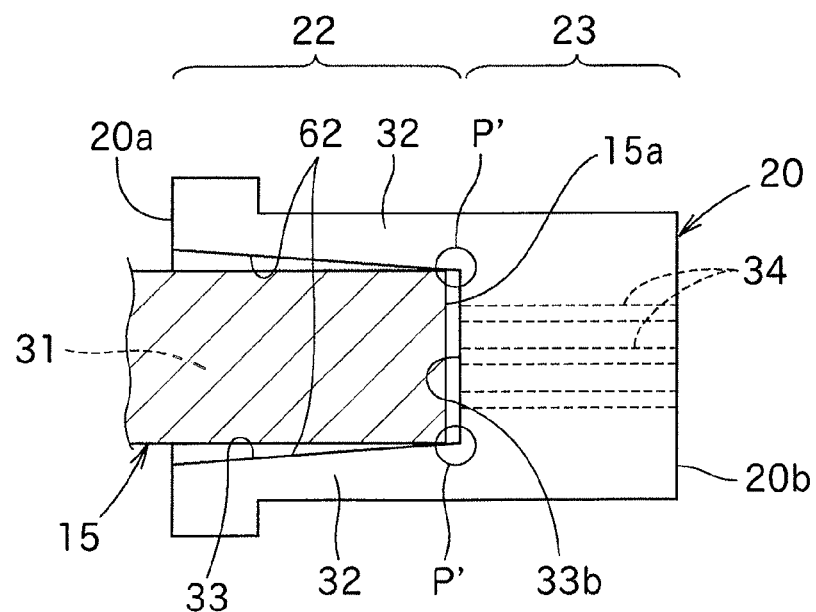
FIG. 8 is a plan view showing an optical connector kit according to another embodiment of the present disclosure with an end portion of an optical waveguide retained in a housing thereof.

Instead of providing the stoppers 61, as shown in FIG. 8, inner side surfaces of the right and left side wall portions 32 of the housing 20 may be taper surfaces 62 inclined closer to each other toward the rear end surface 33*b* of the cavity 33, whereby the distal end face 15*a* of the end portion of the optical waveguide 15 can be properly positioned while being prevented from advancing beyond the position at which the distal end face 15*a* of the end portion of the optical waveguide 15 is spaced the distance d from the rear end surface 33*b* of the housing 20.

Where the side wall portions 32 of the housing 20 respectively have the taper surfaces 62 as described above, the aforementioned stoppers 61 may be additionally provided in portions encircled by circles P' in FIG. 8 for more reliable positioning.

Though not shown, stoppers and a taper surface may be provided on the lower surface of the cover 21 (see FIG. 1) so as to prevent the distal end face 15*a* of the end portion of the optical waveguide 15 from further advancing toward the rear end surface 33*b* of the cavity 33 of the housing 20 without the provision of the stoppers 61 and the taper surfaces 62 on the housing 20 in the above embodiments. In this case, the cover 21 is preferably fixed to the upper portion of the cavity 33 of the housing 20 before the optical waveguide 15 is inserted into the housing 20.

Figure 9:
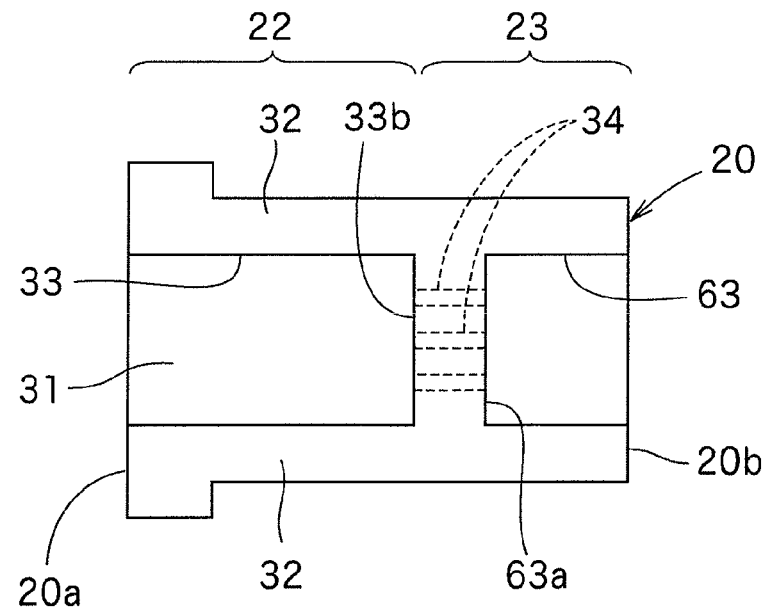
FIG. 9 is a plan view showing a housing of an optical connector kit according to further another embodiment of the present disclosure.

The through-holes 34 provided in the optical fiber retaining portion 23 of the housing 20 to be used in the present disclosure for retaining the optical fibers 40 are not necessarily required to extend through the optical fiber retaining portion 23 from the end face 20*b* of the housing 20 to the rear end surface 33*b* of the cavity 33. For example, as shown in FIG. 9, the optical fiber retaining portion 23 may have a trench 63 extending from the end face 20*b* of the housing 20 toward the cavity 33, and optical fiber retaining through-holes 34 extending from an end surface 63*a* of the trench 63 to the rear end surface 33*b* of the cavity 33. Where the through-holes 34 each have a smaller length, the step of inserting the optical fibers 40 can be more easily performed. Thus, the optical coupling between the optical fibers 40 and the optical waveguide 15 can be achieved at a higher accuracy with an improved productivity.

Figure 10:
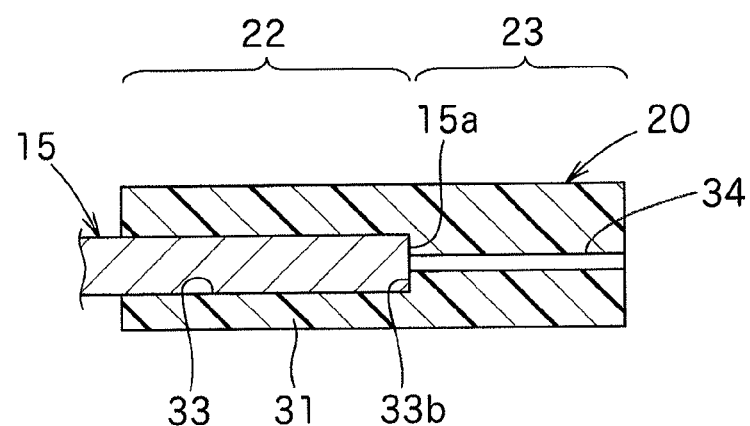
FIG. 10 is a longitudinal sectional view showing an optical connector kit according to another embodiment of the present disclosure with an end portion of an optical waveguide retained in a housing thereof.

The cavity 33 of the optical waveguide retaining portion 22 of the housing 20 to be used for the inventive connector member is not necessarily required to have a recess shape defined by the right and left side wall portions 32 and the bottom wall portion 31 as in the above embodiments, but may be a tubular hole-shaped cavity 33 as shown in a schematic longitudinal sectional view of FIG. 10. In this embodiment, the distal end face 15*a* of the end portion of the optical waveguide 15 reaches the rear end surface 33*b* of the cavity 33, and is brought into direct abutment against the distal end faces of the end portions of the optical fibers 40 (not shown) inserted in the through-holes 34 of the optical fiber retaining portion 23, whereby the optical coupling is achieved. Where the cavity 33 is hole-shaped and is surrounded by a tubular wall, the end portion of the optical waveguide 15 can be more stably retained in the cavity 33. Therefore, the optical connector advantageously has a higher quality over time.

Figure 11:
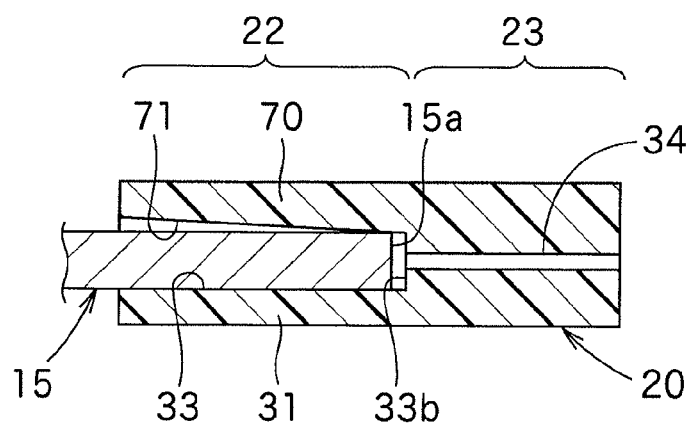
FIG. 11 is a longitudinal sectional view showing a modification of the housing.

In the housing 20 including the tubular optical waveguide retaining portion 22, as shown in FIG. 11, an inner surface of a top wall portion 70 of the tubular optical waveguide retaining portion 22 may be a taper surface 71 inclined closer to the bottom wall portion 31 toward the rear end surface 33*b* of the cavity 33. Thus, the distal end face 15*a* of the end portion of the optical waveguide 15 can be positioned to be spaced from the rear end surface 33*b* of the cavity 33 while being prevented from further advancing toward the rear end surface 33*b* of the cavity 33 as in the embodiments shown in FIG. 8 and the like. In this case, again, stoppers 61 as shown in FIG. 7 may be provided on a peripheral portion of the rear end surface 33b of the cavity 33.

In the housing 20 including the tubular optical waveguide retaining portion 22, not only the top wall portion 70 but also the bottom wall portion 31 may be taper surfaces, so that the cavity 33 is gradually narrowed from vertically opposite sides for the positioning of the optical waveguide 15. Alternatively, as shown in FIG. 8, the right and left side wall portions 32 may be taper surfaces, so that the cavity 33 is gradually narrowed from laterally opposite sides. Further, the cavity 33 may be gradually narrowed from four sides, i.e., the vertically opposite sides and the laterally opposite sides.

In the above embodiments, the recesses, the projections or the taper surfaces provided in the housing 20, the cover 21 or the optical waveguide 15 for positioning the distal end face 15a of the end portion of the optical waveguide 15 are not necessarily required to be located laterally symmetrically with respect to the optical waveguide 15, but the recess, the projection or the taper surface may be provided on one of laterally opposite sides. However, the symmetrical provision is preferred because the optical waveguide 15 can be more stably positioned.

In the connector members described above, the gap d is provided between the distal end face 15a of the end portion of the optical waveguide 15 and the distal end faces of the end portions of the optical fibers 40 by positioning the distal end face 15a of the end portion of the optical waveguide 15 short of the rear end surface 33b of the cavity 33. Alternatively, the gap d may be provided between the distal end face 15a of the end portion of the optical waveguide 15 and the distal end faces of the end portions of the optical fibers 40 by inserting the end portion of the optical waveguide 15 to the rear end surface 33b of the cavity 33 and then retracting the distal end face of the end portion of the optical fibers 40. For example, the through-holes 34 may each have a smaller-diameter mouth portion opening to the rear end surface 33b and having a length d, so that the optical fibers can be inserted short of the rear end surface 33b in the through-holes 34. Alternatively, the inner peripheries of the through-holes 34 are entirely tapered toward the rear end surface 33b, so that the optical fibers 40 can be inserted short of the rear end surface 33b in the through-holes 34.

In the present disclosure, where the distal end face 15a of the end portion of the optical waveguide 15 is spaced the distance d from the distal end faces of the end portions of the optical fibers 40 for the optical coupling, the distance d (see FIG. 4A) is preferably set to 5 to 50 μm, particularly preferably 5 to 20 μm. If the distance d is excessively great, the distal end face 15a of the end portion of the optical waveguide 15 is excessively spaced from the distal end faces of the end portions of the optical fibers 40, thereby increasing the optical connection loss. Therefore, the excessively great distanced is not preferred, because the increase rate of the optical connection loss is liable to be non-negligible. An excessively small distance d is not preferred, because the distal end face 15a of the end portion of the optical waveguide 15 is liable to be damaged.

In the present disclosure, the connector members of FIGS. 7 to 11 out of the connector members for the optical connectors are each adapted to position the optical waveguide 15 only by the positioning means provided in the housing 20 thereof. This eliminates the need for combining the connector member with a specific optical waveguide, making it possible to handle the connector member as an independent component.

Where the optical waveguide 15 is positioned by engaging the projections 37 or the like of the housing 20 of the connector member with the cutaway portions 39 or the like of the optical waveguide 15, as shown in FIGS. 4A to 6, the connector member including these positioning means and the optical waveguide 15 are desirably combined together to be handled as the optical connector kit.

In the housing 20 to be used in the present disclosure, the sectional shape of the through-holes 34 into which the optical fibers 40 are inserted is not limited to a round shape, but may be a polygonal shape such as a triangular shape or a quadrilateral shape.

EXAMPLES

Next, examples of the present disclosure will be described in conjunction with comparative examples. It should be understood that the present disclosure be not limited to the following examples. The amounts (parts) of the following materials are based on weight.

Materials for formation of optical waveguides were prepared in the following manner.

[Under-Cladding Layer and Over-Cladding Layer Forming Material]

Component (a): 60 parts of an epoxy resin (jER1001 available from Mitsubishi Chemical Corporation)
Component (b): 30 parts of an epoxy resin (EHPE3150 available from Daicel Corporation)
Component (c): 10 parts of an epoxy resin (EXA-4816 available from DIC Corporation)
Component (d): 0.5 parts of an acid generator (CPI-101A available from San-Apro Ltd.)
Component (e): 0.5 parts of an antioxidant (Songnox1010 available from Kyodo Chemical Co., Ltd.)
Component (f): 0.5 parts of an antioxidant (HCA available from Sanko Co., Ltd.)
Component (g): 50 parts of ethyl lactate (solvent)

An under-cladding layer and over-cladding layer forming material was prepared by mixing Components (a) to (g) together.

[Core Forming Material]

Component (h): 50 parts of an epoxy resin (YDCN-700-3 available from Nippon Steel & Sumikin Chemical Co., Ltd.)
Component (i): 30 parts of an epoxy resin (jER1002 available from Mitsubishi Chemical Corporation)
Component (j): 20 parts of an epoxy resin (OGSOL PG-100 available from Osaka Gas Chemicals Co., Ltd.)
Component (k): 0.5 parts of an acid generator (CPI-101A available from San-Apro Ltd.)
Component (l): 0.5 parts of an antioxidant (Songnox1010 available from Kyodo Chemical Co., Ltd.)
Component (m): 0.125 parts of an antioxidant (HCA available from Sanko Co., Ltd.)
Component (n): 50 parts of ethyl lactate (solvent)

A core forming material was prepared by mixing Components (h) to (n) together.

Examples 1 and 2

<Preparation of Connector Member>

For preparation of a connector member of Example 1, a housing 20 and a cover 21 (shown in FIG. 1), and a boot portion were produced by injection-molding a polyphenylene sulfide (PPS) resin in predetermined molds. A cavity 33 of the housing 20 for retaining an end portion of an optical waveguide 15 had a width of 3.0 mm, a length of 4.0 mm, and a height of 1.4 mm. The cover 21 was shaped to be fitted in the cavity 33 as seen in plan, and had a thickness of 1.2 mm. An optical fiber retaining portion of the housing 20 had a length of 3.0 mm, and 12 through-holes 34 each having a diameter of 0.127 mm for retaining optical fibers 40 were formed at a pitch of 0.25 mm at a height of 0.05 mm with respect to an upper surface of a bottom wall portion 31 of an optical waveguide retaining portion 22 with their center axes in alignment with optical axes of the cores 51 of the optical waveguide 15.

For preparation of a connector member of Example 2, a housing 20 including a tubular optical waveguide retaining portion 22 having a hole-shaped cavity 33 as shown in FIG. 10, and a boot portion were produced in substantially the same manner as described above by the injection molding. The housing 20 had substantially the same dimensions as in Example 1, except that the hole-shaped cavity 33 had a height of 0.115 mm.

<Preparation of Optical Waveguide>

Figure 12:
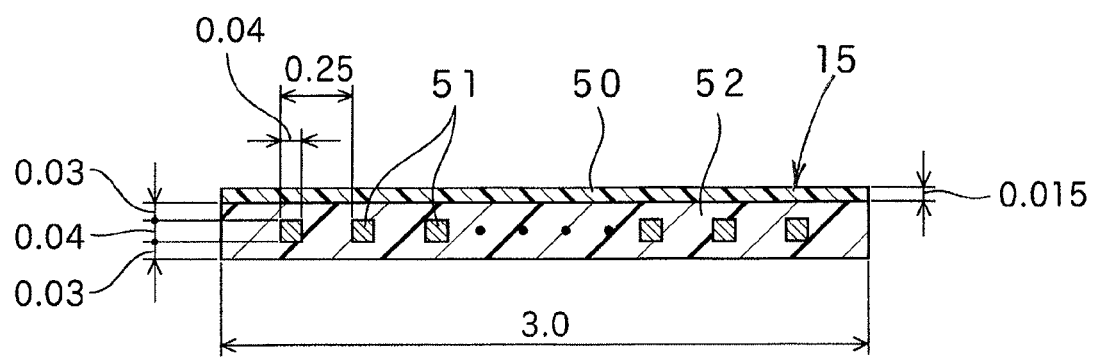
FIG. 12 is a diagram for describing an exemplary optical waveguide to be used in the embodiments of the present disclosure.
Figure 13:
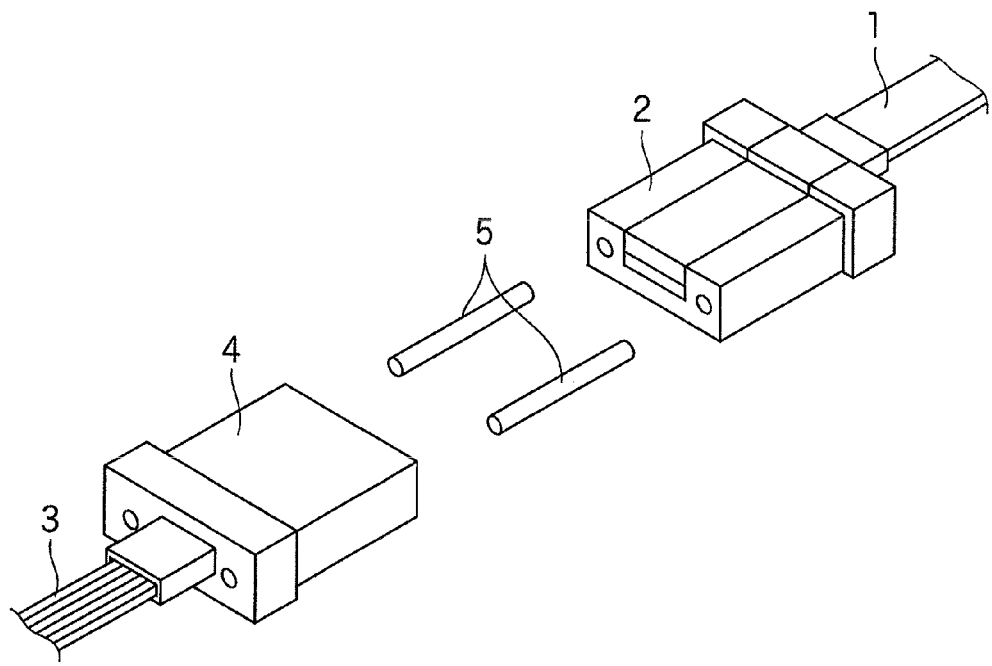
FIG. 13 is a diagram for describing a connection structure for connection between common optical connectors.
Figure 14:
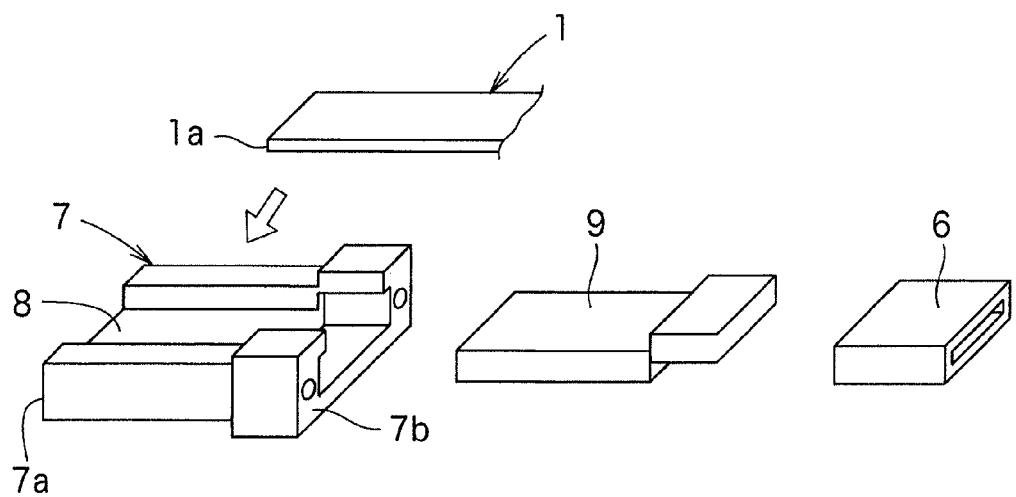
FIG. 14 is a diagram for describing an example of a conventional optical connector.
Figure 15A:
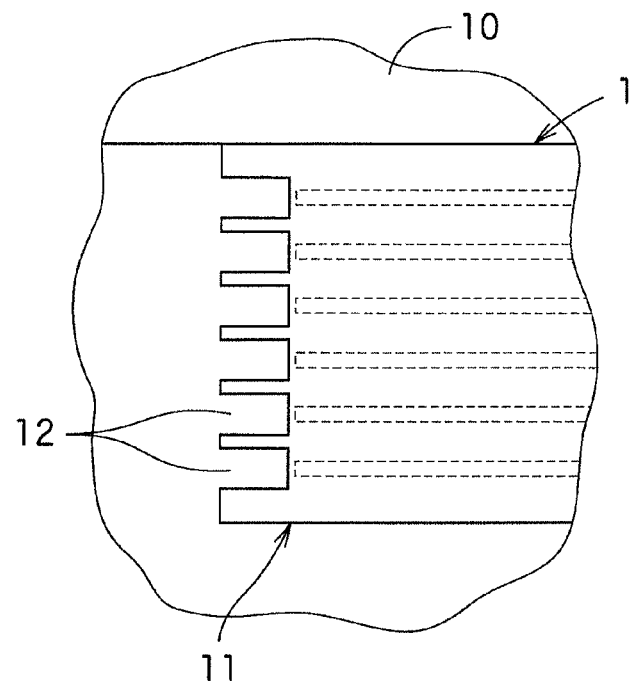
FIG. 15A is a partial plan view showing an exemplary optical waveguide to be used for a conventional passive alignment connection structure.
Figure 15B:
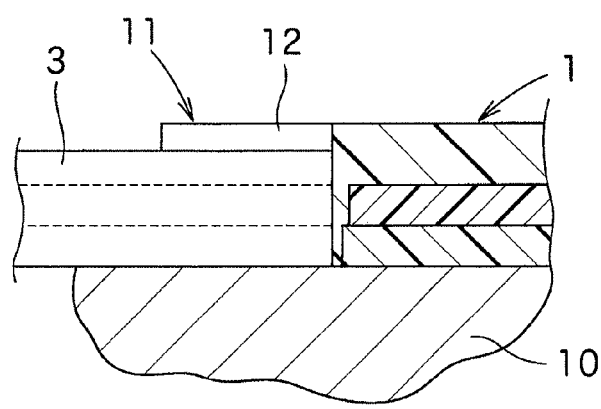
FIG. 15B is a partial longitudinal sectional view showing an optical fiber engaged with the optical waveguide on an enlarged scale.

A 15-μm thick polyimide film was prepared for an insulation layer 50. An under-cladding layer, cores, and an over-cladding layer were formed in a stack on a surface of the insulation layer 50 through a predetermined mask exposure/patterning process by using the aforementioned forming materials, whereby the optical waveguide 15 was produced as having a total length of 5 cm and other dimensions (mm) as shown in FIG. 12. The optical waveguide 15 had a 45-degree mirror formed on one surface thereof. In FIG. 12, a reference numeral 51 denotes the cores, and a reference numeral 52 denotes a cladding layer including the under-cladding layer and the over-cladding layer. In FIG. 12, the shape of the optical waveguide is schematically shown and, therefore, is not consistent in dimensions with the actual shape.

<Assembling of optical Connector>

After a heat-curable epoxy adhesive agent was applied on an upper surface of the optical waveguide 15, the optical waveguide 15 was set in the recess-shaped or hole-shaped cavity 33 of the housing 20. In Example 1, the cover 21 was fitted in the recess-shaped cavity 33 from above, and fixed to the cavity 33. On the other hand, a 50-μm multi-mode fiber ribbon of GI type (a core tape having 12MT-M on opposite ends and available from Hakusan, Inc.) was prepared. A coating material was removed from end portions of optical fibers of the fiber ribbon, which were in turn separated from each other. Then, the end portions of the resulting 12 cores were cut by a fiber cutter available from Fujikura Ltd. After a heat-curable epoxy adhesive agent was applied to the end portions of the respective optical fibers 40, the end portions of the optical fibers 40 were inserted in the through-holes 34 of the housing 20 to be brought into abutment against the distal end face 15a of the end portion of the optical waveguide 15, and fixed to the through-holes 34 (see FIG. 3A). In this state, the heat-curable epoxy adhesive agent was cured by heating. Thus, the optical connector was produced, in which the optical waveguide 15 was optically connected to the optical fibers 40.

Examples 3 and 4

<Preparation of Connector Member>

Figure 4B:
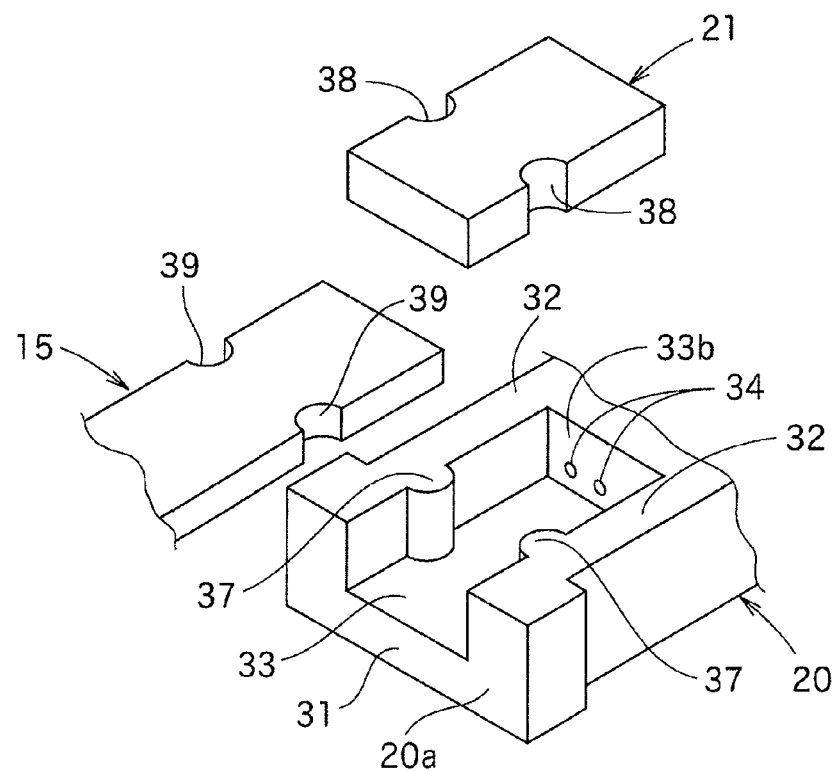
FIG. 4B is a partial perspective view of the optical connector kit.

A housing 20 having projections 37 and a cover 21 having cutaway portions 38 as shown in FIGS. 4A and 4B, and a boot portion were produced by injection-molding a polyphenylene sulfide (PPS) resin in predetermined molds. The projections 37 each had a semicircular plan shape having a radius of 0.25 mm. A cavity 33 of the housing 20 for retaining an end portion of an optical waveguide 15 had a width of 3.0 mm, and a height of 1.4 mm. The cover 21 was shaped to be fitted in the cavity 33 as seen in plan, and had a thickness of 1.2 mm.

<Preparation of Optical Waveguide>

The optical waveguide 15 was produced in substantially the same manner as in Examples 1 and 2, except that the optical waveguide 15 was formed with cutaway portions 39 to be engaged with the projections 37 of the housing 20 (see FIGS. 4A and 4B) of the connector member. The positions of the cutaway portions 39 with respect to a distal end face 15a of the end portion of the optical waveguide 15 are such that, when the projections 37 of the housing 20 were engaged with the cutaway portions 39, the distance d between the distal end face 15a of the end portion of the optical waveguide 15 and a rear end surface 33b of the cavity 33 of the housing 20 was 5 μm in Example 3 and 50 μm in Example 4.

<Assembling of Optical Connector>

First, an abutment plate was placed on the rear end surface 33b of the cavity 33 of the housing 20 to close openings of the optical fiber retaining through-holes 34. After a heat-curable epoxy adhesive agent was applied to end portions of 12 optical fibers 40 prepared in the same manner as in Examples 1 and 2, the end portions of the optical fibers 40 were respectively inserted in the through-holes 34 of the housing 20 to be brought into abutment against the abutment plate, and fixed to the through-holes 34. Subsequently, the abutment plate was removed. A heat-curable epoxy adhesive agent was applied to an upper surface of the optical waveguide 15, and the optical waveguide 15 was set in the cavity 33 of the housing 20 with the projections 37 of the housing 20 in engagement with the cutaway portions 39 of the optical waveguide 15. Then, the upper surface of the optical waveguide 15 was covered with the cover 21 and fixed to the cover 21. In this state, the heat-curable epoxy adhesive agent was cured by heating. Thus, the optical connector was produced, in which the optical waveguide 15 was optically connected to the optical fibers 40.

Comparative Example 1

The same optical waveguide 15 as used in Examples 1 and 2 was attached to a commercially available PMT connector member (PMT ferrule available from Hakusan, Inc.). Thus, an optical connector was produced. It is noted that, after the optical waveguide 15 was set to be flush with a distal end face of the connector member in the conventional manner, an end portion of the optical waveguide 15 was polished.

The optical connectors of Examples 1 to 4 and Comparative Example 1 were evaluated for evaluation items shown below in Table 1, and the results of the evaluation are also shown in Table 1. In Table 1, the structural features of Examples and Comparative Examples are also briefly and collectively shown. Evaluation methods for the respective evaluation items are as follows:

[Optical Connection Loss]

Light transmitted through a 50-μm multi-mode fiber of GI type (FFP-G120-0500 available from Miki, Inc.) connected to an 850-nm VCSEL light source (OP-250LS-850-MM-50-SC available from Miki, Inc.) was received by a 105-μm multi-mode fiber of SI type (AFS105/125Y available from Thorlabs, Inc.) connected to a light receiver, and the intensity $I_0$ of the received light was measured.

On the other hand, light transmitted through the same 50-μm multi-mode fiber of GI type connected to the same 850-nm VCSEL light source as described above was inputted to a 45-degree mirror formed on the optical waveguide 15 of each of the optical connectors of Examples and Comparative Examples. Then, the intensity I of light outputted from the optical fibers 40 of the optical connector was measured by a light receiver.

The optical connector of Comparative Example 1 (employing the PMT connector member) was connected to a commercially available MT connector member (12MT-PF-M ferrule available from Hakusan, Inc.) provided with the same optical fibers 40 as in Examples 1 to 4 and, in this state, the intensity I of light outputted from the optical fibers 40 was measured by a light receiver in the same manner as in Examples 1 to 4. Based on the light intensities thus measured, $[-10 \times \log(I/I_0)]$ was calculated as an optical connection loss.

[Optical Connection Loss (after Thermal Test)]

A heat cycle (−40° C. to 85° C. for 500 cycles) was performed on each of the optical connectors of Examples 1 to 4 and Comparative Example 1, and an optical connection loss was calculated in the aforementioned manner.

[Comprehensive Evaluation]

Based on the results of the evaluation for the above two evaluation items, the optical connectors were each evaluated on a three-level scale, i.e., A (excellent), B (acceptable), and C (unacceptable).

coupling portion. This suppresses the increase in optical connection loss. In Comparative Example 1, in contrast, it is necessary to prepare the optical connector connected to the optical waveguide 15 and the optical connector connected to the optical fibers 40, and connect these optical connectors to each other. This not only requires greater efforts and higher costs but also requires a greater number of components, indicating that the optical connection losses are problematically great from the initial stage.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The present disclosure is widely utilized to provide a connector member and an optical connector kit that allow for easy production of a high-quality optical connector at lower costs, and to provide an optical interconnection employing the connector member or the optical connector kit.

REFERENCE SIGNS LIST

15: OPTICAL WAVEGUIDE
15a: DISTAL END FACE
20: HOUSING

TABLE 1

| | Example 1 | Example 2 | Example 3 | Example 4 | Comparative Example 1 |
|---|---|---|---|---|---|
| Structural features | | | | | |
| Connector type | Optical waveguide & optical fiber unified type | Optical waveguide & optical fiber unified type | Optical waveguide & optical fiber unified type | Optical waveguide & optical fiber unified type | Conventional optical waveguide connector |
| Structure of optical waveguide retaining portion | Recess-shaped, and covered with cover | Hole-shaped | Recess-shaped, covered with cover, and having positioning means | Recess-shaped, covered with cover, and having positioning means | Recess-shaped, and covered with cover |
| Gap between distal end face of optical waveguide and distal end faces of optical fibers | Absent | Absent | Preseant | Present | Absent |
| Distance d (μm) between distal and face of optical waveguide and distal end faces of optical fibers | — | — | 5 | 50 | — |
| Evaluation | | | | | |
| Optical connection loss | 2.6 | 2.5 | 2.6 | 2.8 | 3.1 |
| Optical connection loss after thermal test | 3.1 | 3.0 | 2.7 | 2.9 | 3.4 |
| Comprehensive evaluation | B | B | A | B | C |

The above results indicate that the optical connectors of Examples each have an excellent quality with lower optical connection losses. Particularly, in the optical connectors of Examples 3 and 4, the distal end face 15a of the end portion of the optical waveguide 15 is spaced the distance d from the distal end faces of the end portions of the optical fibers 40 for the optical coupling. Even after the severe heat cycle test, therefore, thermal deformation of the optical waveguide 15 and the optical fibers 40 is less liable to influence the optical 22: OPTICAL WAVEGUIDE RETAINING PORTION
23: OPTICAL FIBER RETAINING PORTION
33: CAVITY
34: THROUGH-HOLE
40: OPTICAL FIBER

The invention claimed is:

1. An optical connector member comprising a single housing which comprises:

an optical waveguide retaining portion for retaining an optical waveguide having a first end portion and a second end portion longitudinally opposite to the first end portion;
an optical fiber retaining portion for retaining an end portion of an optical fiber; and
an optical coupling portion provided between the optical waveguide retaining portion and the optical fiber retaining portion for optically coupling a distal end face of the first end portion of the optical waveguide with a distal end face of the end portion of the optical fiber,
wherein the optical waveguide retaining portion has an optical waveguide retaining cavity formed as a hole or a recess which extends from a first surface of the housing to the optical coupling portion,
wherein the optical fiber retaining portion has an optical fiber retaining through-hole which extends from a second surface of the housing to a rear surface of the optical waveguide retaining cavity and which is configured to completely surround the end portion of the optical fiber,
wherein a bottom surface of the optical waveguide retaining cavity is defined as a reference surface, and a center axis of the optical fiber retaining through-hole extends horizontally at a predetermined height level with respect to the reference surface,
wherein the end portion of the optical fiber is retained in the through-hole of the optical fiber retaining portion,
wherein the optical waveguide retaining cavity is formed with a means for positioning the optical waveguide to form a space between the distal end face of the first end portion of the optical waveguide and the rear surface of the optical waveguide retaining cavity, the space defining the optical coupling portion in which the first end portion of the optical waveguide and the end portion of the optical fiber are optically aligned with each other without bringing the distal end face of the first end portion of the optical waveguide into abutment with the rear surface of the optical waveguide retaining cavity,
wherein the means for positioning the optical waveguide retains an entirety of the first end portion of the optical waveguide in the cavity of the optical waveguide retaining portion without a guide pin, and
wherein the second end portion of the optical waveguide extends outside of the cavity of the optical waveguide retaining portion.

2. The optical connector member according to claim 1, wherein the optical waveguide retaining cavity of the optical waveguide retaining portion is a hole, and the first end portion of the optical waveguide is inserted in the cavity to be retained therein.

3. The optical connector member according to claim 1, wherein the distal end face of the first end portion of the optical waveguide and the distal end face of the end portion of the optical fiber are positioned to be spaced a distance from each other in the optical coupling portion.

4. The optical connector member according to claim 3, wherein the distance between the distal end face of the first end portion of the optical waveguide and the distal end face of the end portion of the optical fiber positioned in the optical coupling portion is 5 to 50 µm.

5. The optical connector member according to claim 1, wherein the optical waveguide retaining cavity is shaped to complement the first end portion of the optical waveguide.

6. The optical connector member according to claim 1, wherein the means for positioning the optical waveguide is at least one selected from the group consisting of a projection, a recess, a stepped surface, and a tapered surface.

7. An optical connector kit comprising:
an optical waveguide having a first end portion and a second end portion longitudinally opposite to the first end portion; and
an optical connector member;
wherein the optical connector member comprises a single housing which comprises:
an optical waveguide retaining portion which retains the first end portion of the optical waveguide;
an optical fiber retaining portion for retaining an end portion of an optical fiber; and
an optical coupling portion provided between the optical waveguide retaining portion and the optical fiber retaining portion for optically coupling a distal end face of the first end portion of the optical waveguide with a distal end face of the end portion of the optical fiber;
wherein the optical waveguide retaining portion has an optical waveguide retaining cavity formed as a hole or a recess which extends from a first surface of the housing to the optical coupling portion;
wherein the optical fiber retaining portion has an optical fiber retaining through-hole which extends from a second surface of the housing to a rear surface of the optical waveguide retaining cavity and which is configured to completely surround the end portion of the optical fiber;
wherein a bottom surface of the optical wave guide retaining cavity is defined as a reference surface, and a center axis of the optical fiber retaining through-hole extends horizontally at a predetermined height level with respect to the reference surface,
wherein the end portion of the optical fiber is retained in the through-hole of the optical fiber retaining portion
wherein the optical waveguide retaining cavity is formed with a means for positioning the optical waveguide to form a space between the distal end face of the first end portion of the optical waveguide and the rear surface of the optical waveguide retaining cavity, the space defining the optical coupling portion in which the first end portion of the optical waveguide and the end portion of the optical fiber are optically aligned with each other without bringing the distal end face of the first end portion of the optical waveguide into abutment with the rear surface of the optical waveguide retaining cavity,
wherein the means for positioning the optical waveguide retains an entirety of the first end portion of the optical waveguide in the cavity of the optical waveguide retaining portion without a guide pin, and
wherein the second end portion of the optical waveguide extends outside of the cavity of the optical waveguide retaining portion.

8. The optical connector kit according to claim 7, wherein the optical waveguide retaining cavity of the optical waveguide retaining portion of the optical connector member is a hole, and the first end portion of the optical waveguide is inserted in the cavity to be retained therein.

9. The optical connector kit according to claim 7, wherein the distal end face of the first end portion of the optical waveguide and the distal end face of the end portion of the optical fiber are positioned to be spaced a distance from each other in the optical coupling portion of the optical connector member.

10. The optical connector kit according to claim 9, wherein the distance between the distal end face of the first end portion of the optical waveguide and the distal end face of the end portion of the optical fiber positioned in the optical coupling portion is 5 to 50 µm.

11. The optical connector kit according to claim 7, wherein the optical waveguide retaining cavity is shaped to complement the first end portion of the optical waveguide.

12. The optical connector kit according to claim 7, wherein the means for positioning the optical waveguide is at least one selected from the group consisting of a projection, a recess, a stepped surface, and a tapered surface.

13. An optical interconnection comprising:
an optical waveguide having a first end portion and a second end portion longitudinally opposite to the first end portion;
an optical fiber; and
an optical connector member;
wherein the optical connector member comprises a single housing which comprises:
an optical waveguide retaining portion which retains the first end portion of the optical waveguide;
an optical fiber retaining portion which retains an end portion of the optical fiber; and
an optical coupling portion provided between the optical waveguide retaining portion and the optical fiber retaining portion for optically coupling a distal end face of the first end portion of the optical waveguide with a distal end face of the end portion of the optical fiber;
wherein the optical waveguide retaining portion has an optical waveguide retaining cavity formed as a hole or a recess which extends from a first surface of the housing to the optical coupling portion;
wherein the optical fiber retaining portion has an optical fiber retaining through-hole which extends from a second surface of the housing to a rear surface of the optical waveguide retaining cavity and which is configured to completely surround the end portion of the optical fiber;
wherein a bottom surface of the optical waveguide retaining cavity is defined as a reference surface, and a center axis of the optical fiber retaining through-hole extends horizontally at a predetermined height level with respect to the reference surface,
wherein the end portion of the optical fiber is retained in the through-hole of the optical fiber retaining portion,
wherein the optical waveguide retaining cavity is formed with a means for positioning the optical waveguide to form a space between the distal end face of the first end portion of the optical waveguide and the rear surface of the optical waveguide retaining cavity, the space defining the optical coupling portion in which the first end portion of the optical waveguide and the end portion of the optical fiber are optically aligned with each other without bringing the distal end face of the first end portion of the optical waveguide into abutment with the rear surface of the optical waveguide retaining cavity,
wherein the means for positioning the optical waveguide retains an entirety of the first end portion of the optical waveguide is retained in the cavity of the optical waveguide retaining portion without a guide pin, and
wherein the second end portion of the optical waveguide extends outside of the cavity of the optical waveguide retaining portion.

14. The optical interconnection according to claim 13, wherein the optical waveguide retaining cavity of the optical waveguide retaining portion of the optical connector member is a hole, and the first end portion of the optical waveguide is inserted in the cavity to be retained therein.

15. The optical interconnection according to claim 13, wherein the distal end face of the first end portion of the optical waveguide and the distal end face of the end portion of the optical fiber are positioned to be spaced a distance from each other in the optical coupling portion.

16. The optical interconnection according to claim 15, wherein the distance between the distal end face of the first end portion of the optical waveguide and the distal end face of the end portion of the optical fiber is 5 to 50 µm.

17. The optical interconnection according to claim 13 wherein the optical waveguide retaining cavity is shaped to complement the first end portion of the optical waveguide.

18. The optical interconnection according to claim 13, wherein the means for positioning the optical waveguide is at least one selected from the group consisting of a projection, a recess, a stepped surface, and a tapered surface.

* * * * *